United States Patent [19]

Chu

[11] Patent Number: 4,627,268

[45] Date of Patent: Dec. 9, 1986

[54] METHOD FOR CALIBRATING INSTRUMENTS FOR TIME INTERVAL MEASUREMENTS

[75] Inventor: David C. K. Chu, Woodside, Calif.

[73] Assignee: Hewlett-Packard Company, Palo Alto, Calif.

[21] Appl. No.: 757,220

[22] Filed: Jul. 19, 1985

[51] Int. Cl.[4] .............................................. G01P 21/00

[52] U.S. Cl. ......................................................... 73/5

[58] Field of Search ................. 73/5, 6; 368/107, 113, 368/121

[56] References Cited

U.S. PATENT DOCUMENTS 3,260,101 7/1966 Ongaro et al. .................... 73/5 UX

FOREIGN PATENT DOCUMENTS 746397 7/1980 U.S.S.R. .............................. 368/107

*Primary Examiner*—Jerry W. Myracle

*Attorney, Agent, or Firm*—Saundra S. Hand; James M. Williams; Edward Y. Wong

[57] ABSTRACT

A method and apparatus is presented for calibrating instruments for time interval measurements, pulse width measurements, and rise and fall time measurements. The preferred method comprises generating two coherent pulses using a linear passive device. The coherent pulses are simultaneously a.c. coupled to two channels of, for example, a time-interval measuring instrument. The time interval between the coherent pulses passing through the instrument is measured at identical voltages on each signal. Then the coherent pulses are exchanged between the channels and a further interval measurement is made. The results of each of the measurements are compared and used to calculate calibration constants to correct systematic errors present in the instrument.

11 Claims, 12 Drawing Figures

METHOD FOR CALIBRATING INSTRUMENTS FOR TIME INTERVAL MEASUREMENTS

BACKGROUND AND SUMMARY OF THE INVENTION

Precision counters can measure time intervals, pulse widths, and transition times with resolution as fine as 20 picoseconds. Although the counter resolution may be in the tens of picoseconds, the accuracy of the counter results itself is limited by systematic errors. These errors can be one nanosecond or larger. Averaging results reduces resolution even further, for example, 1 to 2 picoseconds. But averaging does nothing for systematic errors, so that accuracy remains limited.

Systematic errors are caused by differences in delay between start and stop channel paths in a counter. For example, uncertainties in the trigger level, differences in the propagation delay in the input amplifiers of the counter, and differences in the electrical path lengths in cables or probes leading to the counter all contribute to systematic delay errors in the counter. Furthermore, these delay errors are typically dependent on the nature of the input signal being measured and may vary with input amplitude, slew rate, trigger level, and slope.

To account for systematic errors in counters, the counters are calibrated and the counter measurement results are corrected with calibration constants derived from the calibration process. This calibration process typically involves first providing a known time interaval to the counter, then making a measurement, and finally determining the difference between the measurement result and the known value to derive a calibration constant for correcting future measurements.

Severe difficulties, however, are encountered in the generation of accurate, precise, and repeatable time intervals to act as a standard for calibration. Any attempt to generate signal edges using active devices is unreliable, since active devices will themselves introduce systematic errors which may vary with all the parameters discussed earlier. Additionally, due to finite transition times, that is, rise and fall times of the edges, timing must be measured at precisely well-defined voltages. This is particularly true of signals with opposing slopes. Conventional wisdom usually dictates measurements to be made at "mid-pulse" points; such measurements then necessitate a definition of what constitutes a "full pulse." The determination of a full pulse itself is no trivial matter. To make a proper determination, additional voltage sampling instruments are required to plot out probability densities. Clearly, this additional process unduly complicates the time interval measurement.

In the prior art, the technique for calibrating a counter for time interval measurements between two edges of signals of the same polarity requires two perfectly identical signals applied simultaneously to the input of the START and STOP channels, viz., channel A and channel B, of the counter. The time interval measured is the calibration constant and is subtracted from the results of all similar measurements made by the counter. The difficulty in this calibration technique is assuring that the signals are identical and that their edges occur simultaneously at the same trigger level, or voltage level where timing is measured.

The prior art technique for calibrating a counter to measure the time interval between a positive-going slope and a negative-going slope is even more elaborate. It requires a perfectly symmetrical test pulse. One method of obtaining such a test pulse uses a time-based crystal oscillator to trigger the output of a pulse generator. This pulse generator itself is adjusted with a spectrum analyzer to minimize all even harmonics. The counter being calibrated measures the time interval between the positive-going slope and the negative-going slope of this test pulse. The time interval measured less the half-period of the test pulse gives the systematic error of the counter and its connectors. The accuracy of this procedure is entirely dependent on the time and voltage symmetry of the test pulse and the accuracy of its frequency. Because the spectrum analyzer has active devices, such as transistors, it can introduce an unknown amount of error into this calibration procedure. A means, then, must be used to determine the exact mid-pulse point of the test pulse for this procedure to be valid.

In accordance with the present invention, a method and apparatus are introduced for calibrating a counter for time interval measurements, pulse width meansurements, and transition time skew measurements. These measurements are accomplished with inexpensive linear passive hardware that introduces a minimum amount of distortion, which can be calibrated out along with other systematic errors from other sources. This method according to the invention does not require highly accurate input reference signals. It assures identity of pulses by its linearity and simultaneity through cross-switching of signals through radio-frequency (rf) relays. Because signals are a.c.-coupled, timing is always measured at zero-volt level for all edges. In this way, half-pulse symmetry about zero-volt level is assured.

A biasing method is further provided to extend the usefulness of the method in accordance with the invention from zero-volt to any arbitrary voltage with the same timing accuracy.

Using the method of the present invention, the systematic errors in a counter are determined and a set of calibration constants for the counter are derived using a signal source and linear passive power-splitters and radio frequency relays. By making a series of test measurements in which the sources of systematic error are tested in different combinations, a set of calibration constants for the counter can be derived, which are then subtracted from future similar measurements to compensate for the systematic error in the counter. These test measurements involve using different signal splitters, cross-switching of signals, and configuring the counter to different measurement modes. Both the test measurements and computation can be done automatically in a few seconds using computer control. The calibration method of the invention is applicable when the counter is used alone, or in conjunction with passive or active probes.

DETAILED DESCRIPTION OF THE INVENTION

Same-Slope Time Interval Measurements

Figure 1:
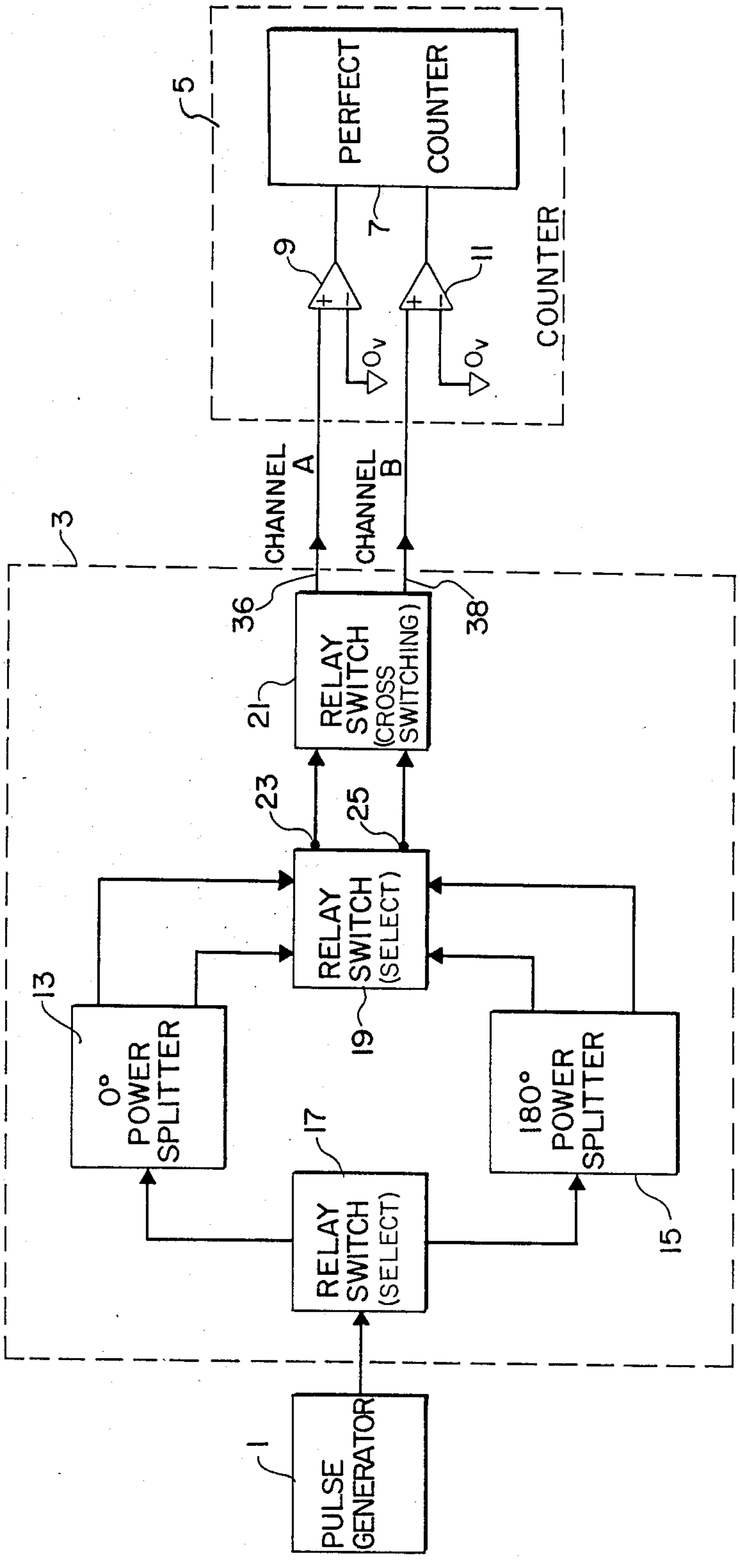
FIG. 1 is a schematic block diagram of a calibration apparatus configured according to the invention for calibration of a counter for time interval measurements.

FIG. 1 shows a test configuration for calibrating a counter which incorporates the apparatus of the invention and in which the calibration method of the invention can be used for same-slope and opposite-slope time interval measurements. Pulse generator 1 produces pulses which, allowing for splitter losses, are similar to those on which later measurements will be performed. The output signal from pulse generator 1 is fed to calibrator 3 which splits the signal into two signals to serve as inputs for the start and stop channels of counter 5.

Calibrator 3 has a 0-degree power splitter 13 which produces two waveforms which are identical to each other except for a possible time skew P. It also has a 180 degree power splitter 15 which produces one waveform which is the negative of the other except for a possible time skew N.

Switch 17 connects the pulse generator 1 to the power splitter 13 when same-slope time interval measurements are taken. When opposite-slope time interval measurements are taken, switch 17 connects the pulse generator 1 to the 180-degree power splitter 15. Switch 19 changes state in tandem with switch 17, so that the power splitter which receives the input signal from pulse generator 1 is connected to output terminals 23 and 25

Switch 21 is connected between output terminals 23 and 25 and the Channel A and Channel B input terminals of the counter 5 Switch 21 has two states enabling the power splitter outputs to be switched between the counter inputs. In one state, output terminal 23 is connected to Channel A and output terminal 25 to Channel B of the Counter 5. In the other state, terminal 25 is connected to Channel A and terminal 23 is connected to Channel B.

For the purpose of calibration, counter 5 can be modeled as a "perfect counter" 7 which has no systematic errors or time delays, and two input amplifiers 9 and 11 to which all the errors and delays are attributed. The Channel A input is connected through amplifier 9 to the start input of counter 7 and Channel B input is connected through amplifier 11 to the stop input of counter 7.

Figure 2A:
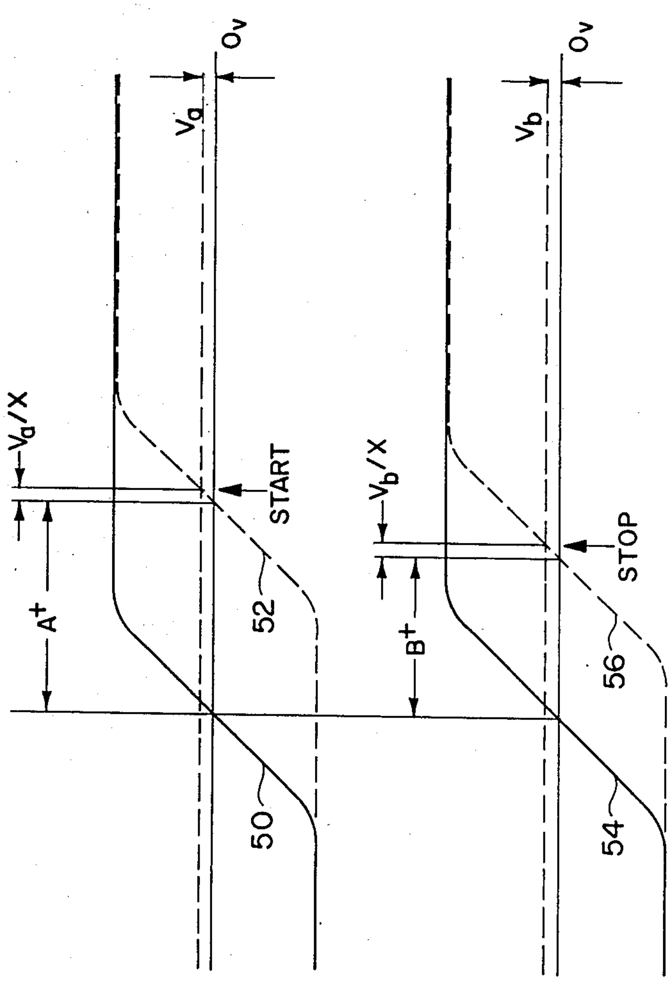
FIG. 2A illustrates typical waveforms of input test signals and signals actually being measured during calibration of a counter for same-slope measurements using the apparatus of FIG. 1.

The difference between the signal from pulse generator 1 and the measured signal for same-slope measurements is illustrated in FIG. 2A. In FIG. 2A, Channel A's input waveform 50 is shown as a sold line and Channel A's measured waveform 52 is shown as a broken line. Similarly, Channel B's input waveform 54 and actual measured waveform 56 are shown as solid and broken lines, respectively. The time difference between waveform 50 and waveform 52, labelled A+, is primarily due to the propagation delay introduced by the counter's input amplifier 9 on this positive-going pulse. Likewise, for Channel B, the time difference between the ideal waveform 54 and the actual waveform 56, labelled B+, is primarily due to the propagation delay introduced by the counter's input amplifier 11 on the positive-going pulse. Both of these time differences contribute to the systematic error in the measurements by counter 5.

Another contribution to systematic error is the time difference due to errors in the triggering voltages for the channels, Va for Channel A, and Vb for Channel B. The timing error introduced by triggering voltage errors Va and Vb is dependent on the slew rate, which is the change in voltage per unit of time, which corresponds to the slope of curves 52 and 56. The resultant timing delay is the voltage trigger level divided by the slew rate. Thus, if the slew rate for Channel A is X, the trigger voltage error contribution is Va/X. Similarly, if the slew rate for Channel B is Y, the trigger volage error contribution is Vb/Y.

A further contributor to systematic error, not illustrated in FIG. 2A, is the difference in path length through power splitter 13 called P. This error, however, is removed through switching the signals between the two outputs of the calibrator. Path length differences in the connecting cables contribute to errors which are lumped with the amplifier errors and are removed.

The most straightforward calibration to be accomplished involves the measurement of signals on the same edge, i.e. with the same slope. Identical signals are provided to the A and B channels of the counter via a matched power-splitter. Both channels are set to measure the time interval at the same positive slope edge and at the same trigger-level, 0.00 volts. Ideally, a zero reading should be obtained. The actual reading, T1, represents the difference between the B and A channel propagation delay on positive slopes, or $$B+-A+=\mathrm{T1} \quad (1)$$

Similarly, by setting both channels to negative slope, a measurement T2 is taken. This represents the difference in propagation delay between B and A channels on negative slopes, $$B--A-=\mathrm{T2} \quad (2)$$

The effect of trigger-level errors can also be included. If the trigger-level error is V, the timing errors associated with the measurement are negative (the measured interval is shorter) for a positive slope start pulse or a negative slope stop pulse, and positive (the measured interval is longer) for a negative slope start pulse or a positive slope stop pulse.

In addition, the small but finite time skew P between the signals due to a difference in electrical path lengths within the power-splitter or in the cables can be included by taking measurements with the cables reversed.

When the effects of time skew P, and trigger levels Va and Vb are included, equations (1) and (2) become:

$$B+-A+-Va/X+Vb/X+P+=T1 \quad (3)$$

$$B--A-+Va/Y-Vb/Y+P-=T2 \quad (4)$$

where:

- A+ is the channel A positive slope propagation delay,
- A− is the channel A negative slope propagation delay,
- B+ is the channel B positive slope propagation delay,
- B− is the channel B negative slope propagation delay,
- Va is the channel A trigger error,
- Vb is the channel B trigger error,
- X is the rising slew rate,
- Y is the falling slew rate,
- P+is the positive slope time skew,
- P−is the negative slope time skew.

With the signals to Ch A and Ch B reversed and measurements repeated, two more time interval calibration measurements analogous to (3) and (4) can be taken:

$$B--A-+Va/Y-Vb/Y-P-=T3 \quad (5)$$

$$B+-A+-Va/X+Vb/X-P+=T4 \quad (6)$$

The averages of the measured time intervals T1,T4 and T2,T3 give:

$$(T1+T4)/2=B+-A+-(Va-Vb)X \quad (7)$$

$$(T2+T3)/2=B--A-+(Va-Vb)Y \quad (8)$$

Equations (7) and (8) give the desired calibration constants if the trigger-levels Va and Vb are set to 0.00 volts. In the case of a counter with finite hysteresis band on the triggering circuit, the trigger points are both half a band up or down from 0.00 volt depending on slope, Va−Vb will still be 0 and (7) and (8) would still be valid. Large slew rates X and Y also tend to minimize trigger-level induced errors.

The measurements made provide enough redundancy for checking the accuracy of the calibration by making a distinction between P+ and P− skew times, corresponding to using positive and negative slopes. By observing (T1−T4)/2, and (T2−T3)/2, we get P+ and P−. The difference between P+ and P−, which can be determined from the measurements, given by $$(P+-P-)=(T1-T2+T3-T4)/2 \quad (9)$$

provides a check on the accuracy of the calibration. Deviation of (P+−P−) from zero is an indication of the magnitude of measurement errors and consistency of the calibration procedure.

Opposite-Slope Time-Interval Calibration

For calibration using opposite slopes on Channel A and Channel B, a standard of "zero time" is required, i.e. we need two signals which must switch in opposite directions across a common trigger level at precisely the same time, or at most differ by a fixed slope-independent delay between them similar to the P's discussed before. Most active circuits cannot do this. It is not unusual even for a high frequency differential amplifier to have turn-on and turn-off delays differing by hundreds of picoseconds.

The apparatus shown in FIG. 1 can also be used to perform calibration for measurements of time intervals between pulse edges of opposite slope. The difference between the input signal from pulse generator 1 and the measured signal for opposite slope measurements is illustrated in FIG. 2B.

Figure 2B:
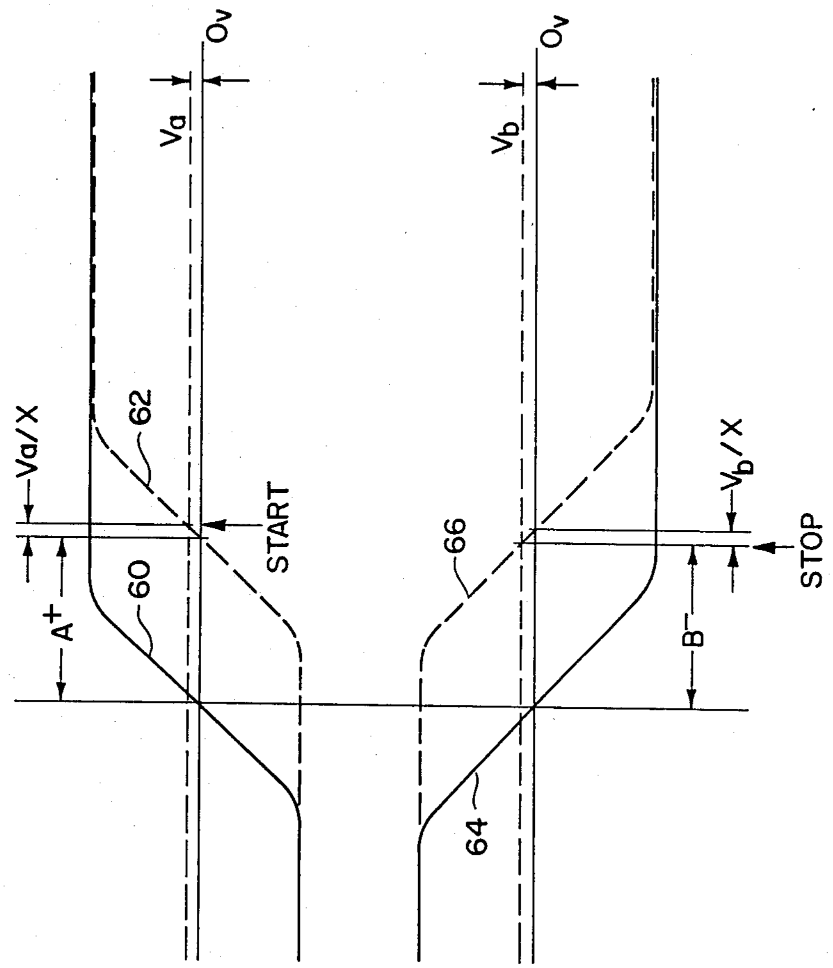
FIG. 2B illustrates typical waveforms of input test signals and signals actually being measured during calibration of a counter for opposite-slope measurements using the apparatus of FIG. 1.

In FIG. 2B, Channel A's input waveform 60 is shown as a solid line and actual measured waveform 62 is shown as a broken line. Similarly, Channel B's input waveform 64 and actual measured waveform 66 are shown as solid and broken lines, respectively. The time difference between waveform 60 and waveform 62, labelled A+, is primarily due to the propagation delay introduced by the counter's input amplifier 9 on this positive-going pulse. Likewise, for Channel B, the time difference between the ideal waveform 64 and the actual waveform 66, labelled B−, is primarily due to the propagation delay introduced by the counter's input amplifier 11 on this negative-going pulse. As with same slope pulse measurement, both of these time differences contribute to the systematic error in the measurements by counter 5.

When the counter measures the time interval between Channel A's starting point on waveform 2B−62 and Channel B's stopping point on waveform 2B-66, other kinds of systematic error are encountered. Again, the difference in errors of the triggering voltages for the channels, Va for Channel A, and Vb for Channel B contribute to systematic error. These trigger voltage error contributions must be taken into account as they were in same-slope measurement, to determine suitable calibration constants.

Also, as in the same-slope case, the path length difference through power splitter 15 and the connecting cables should be taken into account. This time difference is called N, different from the same slope case P because a different power-splitter is used.

For the opposite-slope calibration case, the signals are provided by a 180-degree power-splitter, which is a linear passive device. Its delay is slope-independent. As with the zero degree power splitter, we can account for and remove the effect of a fixed skew between the two output ports.

Two measurements are made, first with channel A set to positive slope and channel B to negative slope, and then vice versa. Including the effects of skew N and of the trigger-levels, the measurements produce results T5 and T6 related to amplifier delays as follows:

$$B--A++N+--Va/X-Vb/X=T5 \quad (10)$$

$$B+-A-+N-++Va/Y+Vb/Y=T6 \quad (11)$$

where:

- N+− is the skew with Channel A positive slope and Channel B negative slope,
- N−+ is the skew with Channel A negative slope and Channel B positive slope,
- X,Y are the signal slew rates for leading and trailing edges.

Reversing the cables at the calibrator end, two more measurements are made producing results T7 and T8 related to Channel A and Channel B delays as follows:

$$B+-A--N-++Va/X+Vb/X=T7 \quad (12)$$

$$B--A+-N+--Va/Y-Vb/Y=T8 \quad (13)$$

As before, a distinction is made between delays N+− and N−+ of the calibrator corresponding to skews at different slopes. Consistency can now be checked by observing (T5−T8)−(T6−T7) since:

$$(N+--N-+)=(T5-T6+T7-T8)/2 \quad (14)$$

Deviation from zero gives an indication of the magnitude of measurement errors and serves as a useful check on the consistency of the calibration measurements taken. The averages of T5,T8 and T6,T7 give, $$(T5+T8)/2=B--A+-(Va+Vb)(1/X+1/Y) \quad (15)$$

$$(T6+T7)/2=B+-A-+(Va+Vb)(1/X+1/Y) \quad (16)$$

Analogous to the same-slope case, the calibration constants for the opposite slope measurement are given by equations (15) and (16) if (Va+Vb)=0. In practice, therefore, the trigger levels Va and Vb can be set accurately to 0.00 volt, and the effect of hysteresis makes the actual trigger points symmetric about center for opposite slope measurements, preserving Va+Vb=0. Thus equations (15) and (16) produce the desired opposite slope calibration constants and do not need correction for hysteresis.

In summary, with the results T1 through T8 obtained by the 8 measurements described, the calibration constants for the four possible measurement setup combinations, using start Channel A and stop Channel B for detection of either positive or negative slope edges, can be defined as follows, T++(both start and stop positive)=(T1+T4)/2 (17a)

T−−(both start and stop negative)=(T2+T3)/2 (17b)

T+−(start positive, stop negative)=(T5+T8)/2 (17c)

T−+(start negative, stop positive)=(T6+T7)/2 (17d)

The calibration constants are to be subtracted from all future measurements whenever the corresponding slopes are used for similar signal magnitudes during calibration, at 0.00 V trigger level.

To summarize the calibration procedure for time interval measurements, the counter 5 to be tested is connected to the outputs of calibrator 3. The counter trigger level is set to 0.00 V. With the zero degree power splitter connected, measurements are taken for same-slope waveforms, with the counter start and stop channels set to trigger on positive slope edges, and with the start and stop channels triggering on negative slope edges. Then the connecting cables are switched so the calibrator outputs go to the opposite counter input channels and two more measurements are taken. A second set of four measurements is taken with the 180 degree power splitter connected. These measurements are analogous to the first set of measurements, but the counter start and stop channels are triggered on the opposite slope edges of the test waveform. From the results of these eight test measurements, the four needed calibration constants can be determined according to equations 17(a),(b),(c) and (d). Signals used to calibrate the counter should be at approximately 50% duty cycle and resemble actual signals to be measured later. The proper calibration constant can then be added to the measurements made with the counter to provide time interval measurements with the systematic error significantly reduced.

Probes

For counters with high impedence probes, the delays of the probes are lumped together with those of the input amplifiers of the counter.

Figure 3:
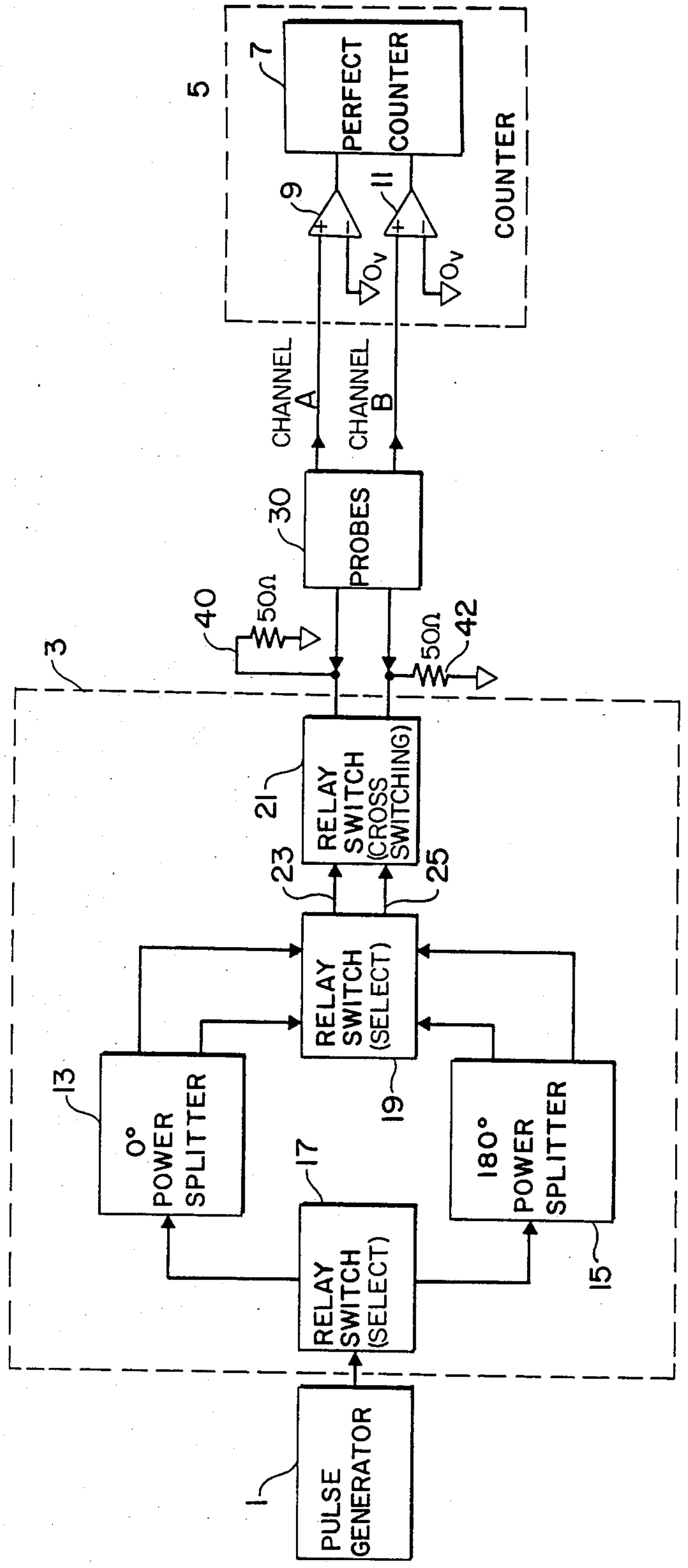
FIG. 3 is a schematic block diagram of the test apparatus shown in FIG. 1 adapted for use with a counter having high impedance probes.

FIG. 3 shows an alternate test configuration to be used when the counter has high impedance probes for input. High impedance probes 30 are connected to the outputs of calibrator 3 and to input channels A and B of counter 5. When high impedance probes 30 are used, the outputs of the calibrator 3 must be terminated by 50 ohm resistors 40 and 42. Alternatively, if no resistors 40 and 42 are present, then the pulse generator must be source terminated by 50 ohms. The eight measurements T1 through T8 are obtained as before. The calibration constants obtained are for the probe/counter combination.

Since probe or cable mismatches are lumped with the counter systematic errors during calibration, the same probes and cables must be used later for measurement for calibration to be valid.

Pulse Width Calibration Procedure

In pulse width measurement, a single signal is split internally by the counter and the time interval measurement is made on the opposite slope edges. The effect of the internal splitter must be taken into consideration for calibrating such measurements. In the case of probes, a single probe is used for both start and stop operations. The delays will in general be different than when using two probes. A separate calibration procedure for this new situation is therefore required.

Figure 4:
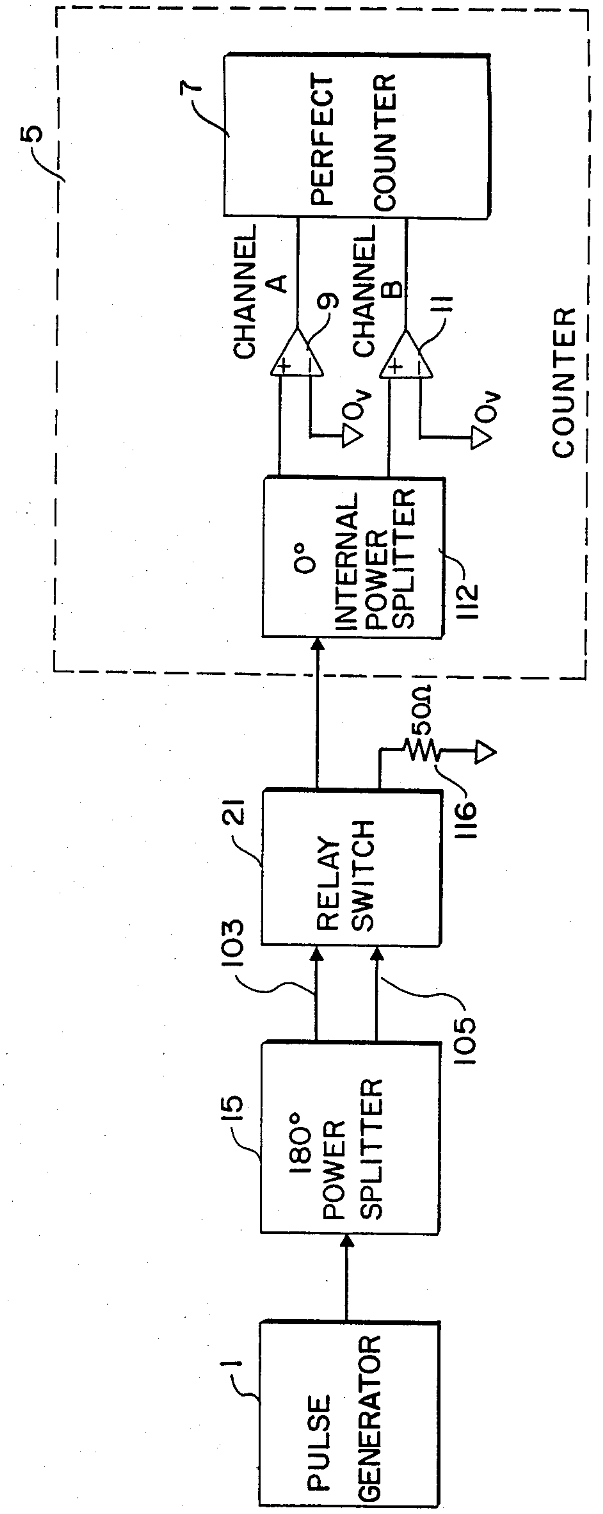
FIG. 4 is a schematic block diagram of a calibration apparatus configured according to the invention for calibration of a counter for pulse width measurements.

FIG. 4 shows the hardware configuration for calibrating a counter for pulse width measurements. Pulse generator 1 provides test pulses to a 180 degree power splitter 15. Power splitter 15 produces two output signals, one at terminal 103 and a second at terminal 105 which are negative of the other. Using switch 21, either the signal at terminal 103 or the signal at terminal 105 is connected to the input of counter 5, while the output of the other terminal is connected to a 50 ohm resistor 116. Counter 5 is modeled as a perfect counter 7, which has no delays, preceded by two amplifiers 9, 11 which have all the delays in the counter; and a 0-degree internal power splitter 112. The input signal goes into the internal power splitter 112, which provides two signals for Channels A and B input amplifiers 9 and 11. Channel A input amplifier 9 creates a delay of A+ on the positive-going portion of the input signal. Internal power splitter 112 creates a skew of D− on the negative-going slope of the Channel B signal and the Channel B input amplifier 11 creates a propagation delay of B− on that negative-going slope. For clarity, trigger level induced errors are omitted from this diagram. Measurement takes place from rising output of amplifier 9 to falling output of amplifier 11.

Figure 5A:
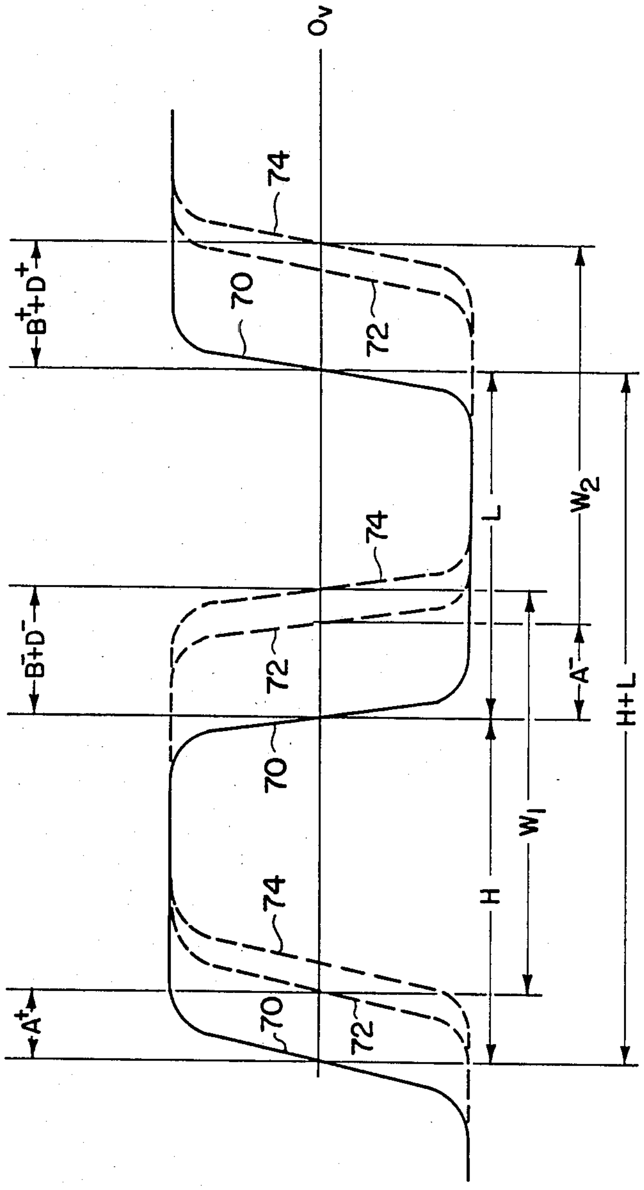
FIGS. 5A and 5B illustrates typical waveforms of input test signals and signals actually being measured during calibration of a counter for pulse width measurement using the apparatus of FIG. 4.
Figure 5B:
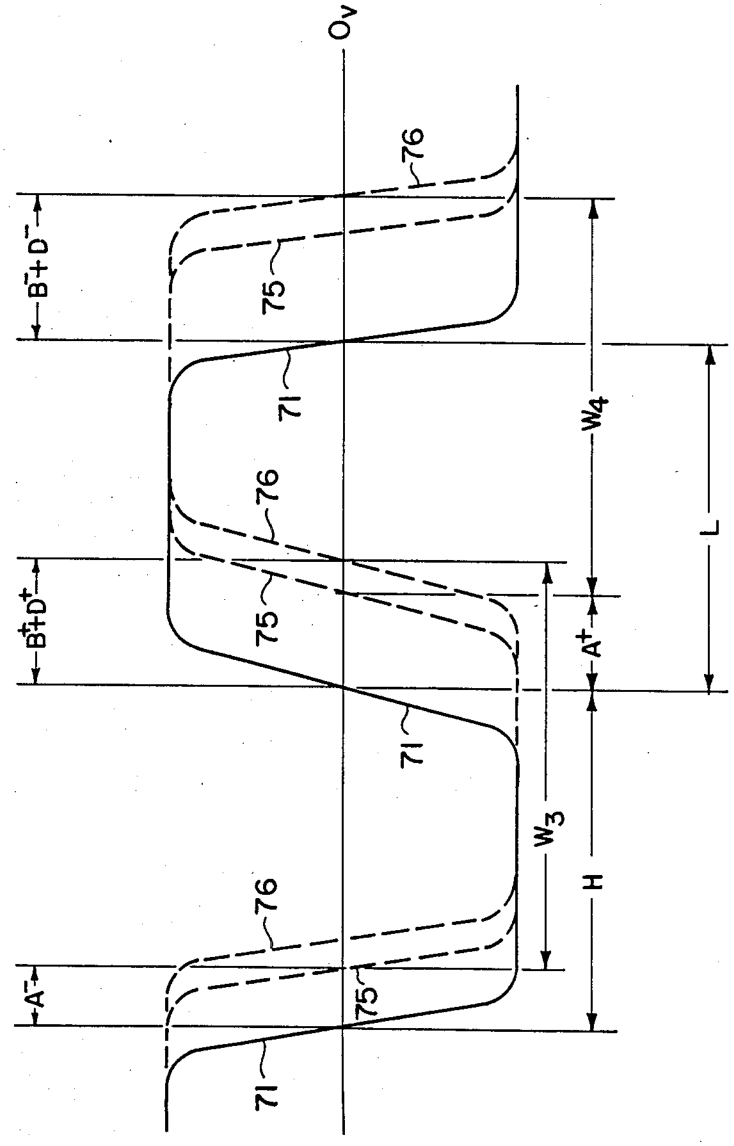

FIG. 5(*a*) shows the waveforms in Channel A and Channel B of the counter when the counter is configured for pulse width measurement. The waveform 70 is the waveform at the counter input. Waveform 72 is the output of amplifier 9. The difference between the two waveforms is primarily due to propagation delay A+ introduced by the counter's input amplifiers 9 in Channel A. Waveform 74 is the output of amplifier 11. The difference between this waveform and the input waveform 70 is due to propagation delay introduced by the counter's internal power splitter and Channel B's input amplifiers. For a negative slope, these are D− and B− respectively.

The counter attempts to measure the pulse width H of waveform 70 from the positive slope edge of waveform 72 to the negative slope edge of waveform 74. As in time interval measurements a difference in the triggering voltage between Channel A and Channel B will introduce additional systematic errors into the measurements. The measured pulse width H is decreased by the delay in start Channel A and increased by the delay in stop Channel B. Thus, the measured value W1 contains H and the errors as ignoring trigger level induced error:

$$W1 = B- + D- - A+ + H \quad (18)$$

In FIG. 5(*b*), the waveform 71 is inverted from waveform 70 in FIG. 5(*a*) due to switching of relay switch 21 in FIG. 4 to the other terminal of the 180 degree power splitter 102.

Waveform 75 is delayed by A+ and waveform 76 is delayed by (B− +D−) for measurement by Channel A and Channel B. The resulting measurement W4 then consists of the other half wave L plus error terms similar to W1:

$$W4 = B- + D- - A+ + L \quad (19)$$

Waveforms using negative slope at A Channel positive at B is exactly analogous producing width measurements W2 and W3. This will not be redrawn.

Finally, a period average measurement is made. In period measurement, systematic errors are negligible, the resulting period Per is the sum of H and L.

If the waveform 70 has rise and fall slew-rates X and −Y, it can be assumed that the waveform 71, being a mirror image, has fall and rise slew-rates −X and Y respectively. Four measurements W1, W2, W3, and W4 are made, two with 70 and two with 71. These measurements, when viewed in component form, are summarized in the table below.

| Port A B | Slopes | Quantity Expected from Model | Measurement Results |
|---|---|---|---|
| #1 | + − | B− − A+ + D− + H − Va/X − Vb/Y | = W1 20 |
| #1 | − + | B+ − A− + D+ + L + Va/Y + Vb/X | = W2 21 |
| #2 | − + | B+ − A− + D+ + H + Va/X + Vb/Y | = W3 22 |
| #2 | + − | B− − A+ + D− + L − Va/Y − Vb/X | = W4 23 |
| | | (Per with 0.01 sec gate) H + L | = PER 24 |

where:
D+ is the positive slope internal delay,
D− is the negative slope internal delay,
H is the high half period of the test signal,
L is the low half period of the test signal.

The internal power splitter delay D is treated as slope-dependent D+ and D− which are lumped with the amplifier propagation delays and calibrated out. The effect of trigger-level error is included. Stability of both period and width of the source are important.

The desired calibration constant W+− for positive pulses, and W−+ for negative pulses, corrected to 0.00 V, are ideally $$W+- = B- - A+ + D- - Va/X - Vb/Y \quad (25)$$

$$W-+ = B+ - A- + D+ + Va/X + Vb/Y \quad (26)$$

There may be computed from the measurement results W1-4 and PER as:

$$W+- = (W1 + W4 - \mathrm{Per})/2 \quad (27a)$$

$$W-+ = (W2 + W3 - \mathrm{Per})/2 \quad (27b)$$

Equations (25) and (26) will give the calibration constant W+− and W−+ if Va=Vb=0, i.e. trigger-levels at 0.00 V. In case of hysteresis where Va+Vb=0, rise and fall slew rates must be equal for (25) and (26) to be correct.

A consistency check for the calibration constants can be made by two other estimates each of W+− and W−+ using slightly different parameters:

$$W+-(\mathrm{a}) = W1 - \mathrm{Per}/2 - (W1 - W2 - W3 - W4)/4 \quad (28a)$$

$$W+-(\mathrm{b}) = W4 - \mathrm{Per}/2 + (W1 - W2 + W3 - W4)/4 \quad (28b)$$

and $$W-+(\mathrm{a}) = W2 - \mathrm{PER}/2 + (W1 - W2 + W3 - W4)/4 \quad (29a)$$

$$W-+(\mathrm{b}) = W3 - \mathrm{PER}/2 - (W1 - W2 + W3 - W4)/4 \quad (29b)$$

These estimates bracket the calibration constant values W+− and W−+ determined in (27a) and (27b). The discrepancies will be small if the trigger-level errors Va and Vb are small and also the slew rates X and Y are large and about equal. It is cumbersome to go into details, suffice to say the main W+− and W−+ assume the slew rates to be the average of X and Y while the other estimates make a distinction of which edge is X and which is Y.

In summary, the width measurement calibration procedure requires four time interval measurements and one period measurement. The 180-degree power splitter in the calibrator is used to produce two output signals from the test input signal. Two measurements are made with one of the output signals from the power splitter connected to the counter, first with Channel A triggering on the positive slope edge and Channel B triggering on the negative slope, then with the slopes reversed. Two more measeuements are made with the other output signal from the power splitter connected to the counter, again reversing the triggering polarity after the first measurement. Finally, a period measurement is made over a relatively long sampling time to achieve an accurate average period measurement.

From the results of these five test measurements, the two needed calibration constants can be determined according to equations 27a and 27b. The proper calibration constant can then be added to the pulse width measurements made with the counter to provide measurements with the systematic error significantly reduced.

Figure 6:
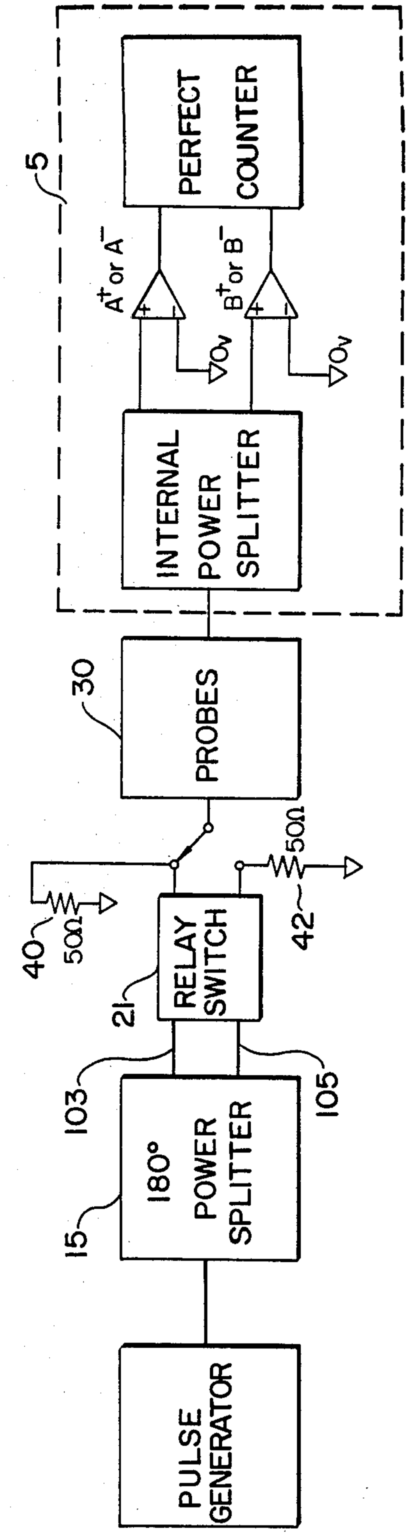
FIG. 6 shows the apparatus of FIG. 4 adapted for use with a counter having high impedance probes for pulse width measurements.

FIG. 6 shows an alternate test configuration to be used when the counter has high impedance probes 30 connected to its input. When high impedance probes 30 are used, the output of the 180-degree power splitter 15 must be terminated either with 50 ohm resistors 40, 42 or source terminated at the pulse generator. The switch 21 switches the high impedance probe 30 between the two outputs of the power splitter 15.

Rise & Fall Time Calibration

Figure 7:
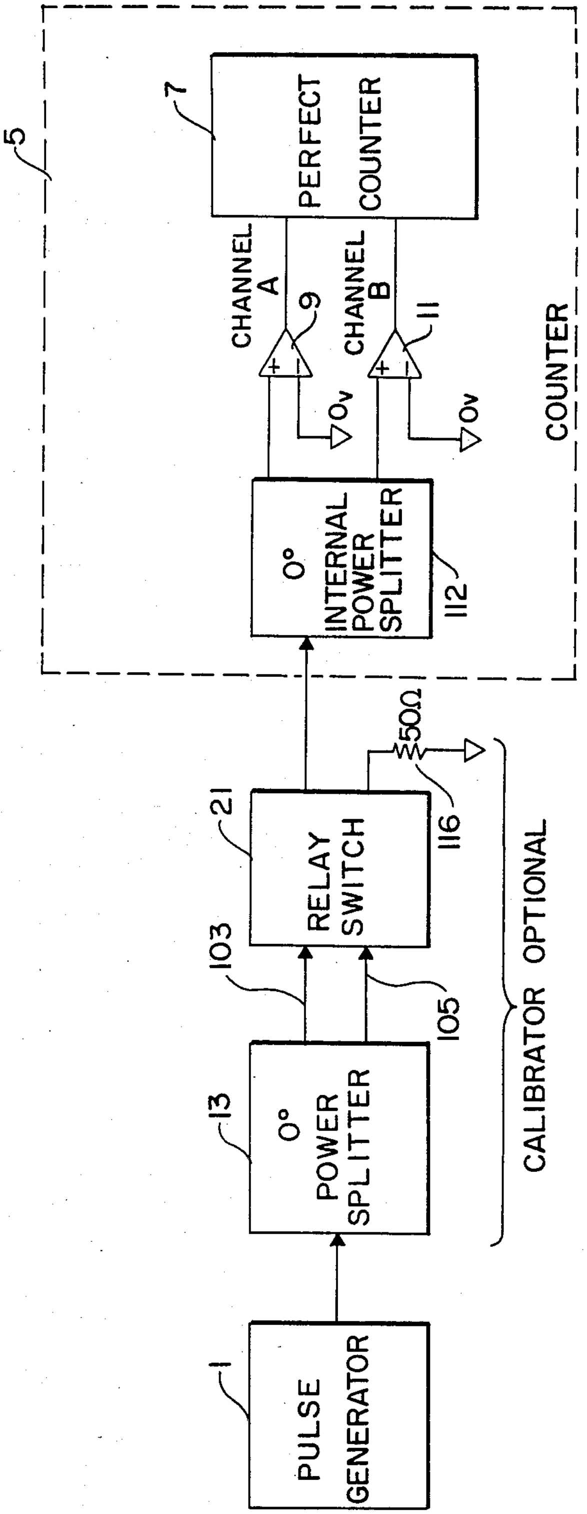
FIG. 7 is a schematic block diagram of the calibration apparatus configured according to the invention for calibrating a counter for measuring rise and fall times.

Rise and fall time measurements are similar to width measurements except the same slopes are used for both A and B channels. Here we can only calibrate out errors at mid-pulse before setting trigger-levels to extreme values such as 10–90%. FIG. 7 shows the hardware needed to calibrate the counter 5 for rise and fall time measurements. Except for replacement of 180-degree by 0-degree power splitter 13 (shown in FIG. 4), this hardware is identical to pulse width calibration hardware shown in FIG. 4.

Figure 8:
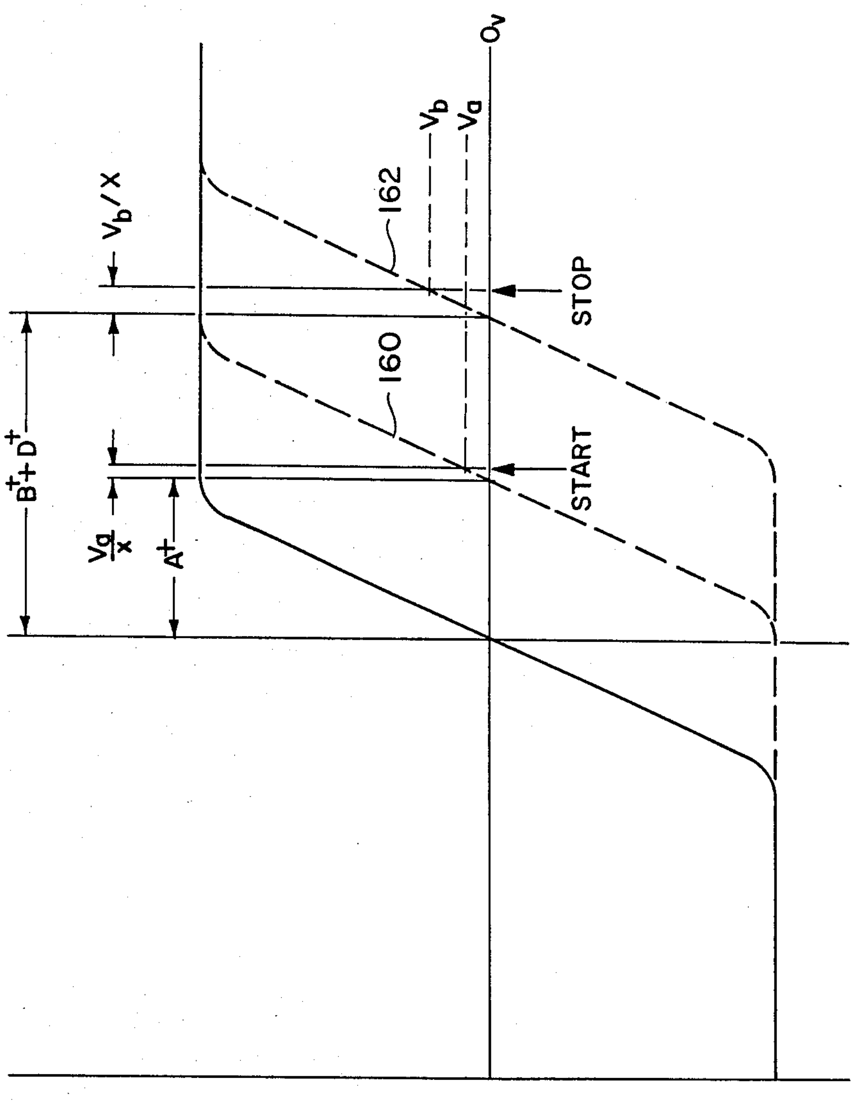
FIG. 8 illustrates typical waveforms of input test signals and signals actually being measured during the calibration of a counter measuring rise and fall times using the apparatus of FIG. 7.

When Channel A's signal 160 (shown in FIG. 8) exceeds the trigger voltage Va, the measurement begins. Measurements end when Channel B's signal 162 equals Vb. The result is R. The Channel A's input amplifier 9 (shown in FIG. 7), introduces a delay of A+. Power splitter 112 introduces a delay called D+ and Channel B input amplifier 11 introduces a delay of B+. Ideally, the trigger level Va and Vb are equal. If they are not equal, a time interval error of $(Vb-Va)/X$ will be introduced with X being the slew rate of the signals.

Using only one input signal, two T.I. measurements are made resulting in R and F. When viewed in component form, R and F are:

| Slopes | Expected Quantities | | Results | |
|---|---|---|---|---|
| A B | $B+ - A+ + D+ + (Vb - Va)/X$ | = | R | (30) |
| + + | $B- - A- + D- - (Vb - Va)/Y$ | = | F | (31) |

Using fast slew rates X, Y and setting the trigger-levels as close as possible, the last terms can be made negligible. The R and F are the rise and fall time calibration constants. for calibrating slower signals, it is essential to adjust the trigger-levels very accurately, i.e. $Vb=Va=0.00$ V. For correctly adjusted trigger-level, R and F do not change with small changes in the slew rate. Notice that hysteresis effect is again cancelled out if the midband levels are adjusted to 0.00 volt, since both Va and Vb are effectively either one half band up or down depending on slope for a hysteresis band H. For the same slopes, $Va-Vb=0$.

Calibration of rise— and fall— duration at 10% on one channel and 90% on the other cannot be done completely with this method, which is suited for same trigger levels around mid-pulse and can therefore remove skew at midpulse prior to setting trigger levels at pulse extremes such as 10% to 90%.

Calibration At Arbitrary Trigger-levels

Figure 9:
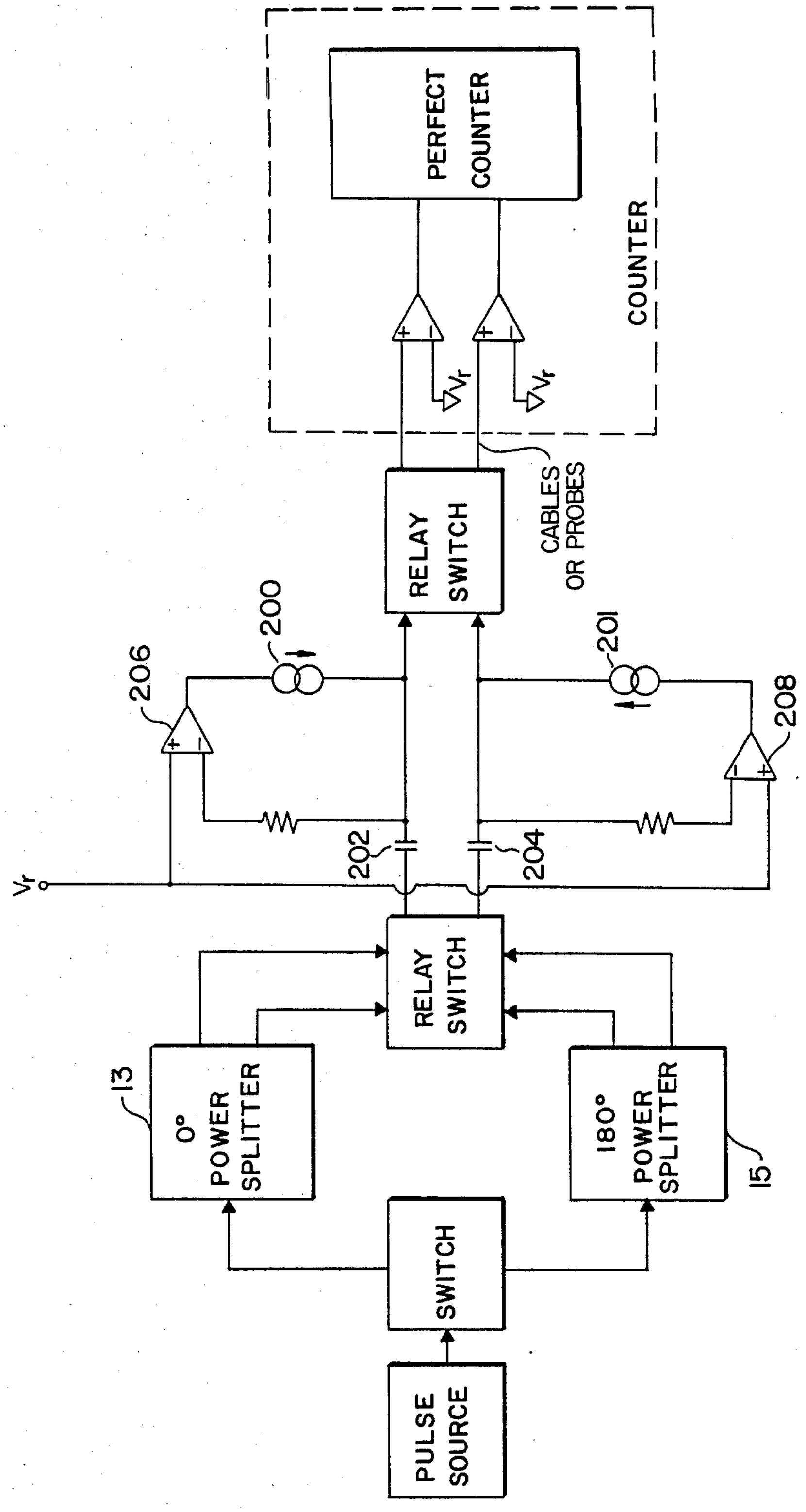
FIG. 9.is a schematic block diagram of the calibration apparatus as shown in FIG. 1 with the addition of blocking capacitors and controlled current sources for obtaining triggering at levels other than zero volt.

Up to this point, all calibrations were done with trigger-level at 0.00 volts. This is not desirable for the users who would like to calibrate at mid-transition voltage of the logic family, e.g. $-1.3$ V for ECL. It is possible to do so with the addition of bias current sources and blocking capacitors from the calibrator output. FIG. 9 shows the hardware needed to obtain trigger voltages other than 0 volts. Current sources 200 and 201 provide the bias currents to produce a DC offset voltages equal to the triggering voltage Vr. These are controlled by operation amplifiers 206 and 208 which sense the calibrator output voltages 36 and 38 and compare them to input voltage Vr. Blocking capacitors 202 and 204 keep the current from flowing into the power splitters 13 and 15.

In each channel, the bias current from the current sources 200, 201 must provide a DC offset voltage precisely equal to the trigger-level of that channel. For example, if Channel A is to be calibrated at 1.00 volt, then a bias current equal to 20.0 mA is needed. The trigger-levels for the two channels, strictly speaking, need not be the same. Using 50% duty cycle, however, valid calibration will always be done about mid swing, regardless of the absolute voltages used.

In the case of high impedance probes, just as before, termination resistors are needed at the calibrator output or input as shown in FIG. 3.

In width measurement or rise/fall time measurement calibration, botn channels must be at the same trigger-level.

The calibration procedure of the invention is generally carried out automatically with a controller operating the switches in the calibrator, setting the trigger voltage and the slope polarity of the counter input channels, and deriving the calibration constants from the results of the test measurements.

Figure 10:
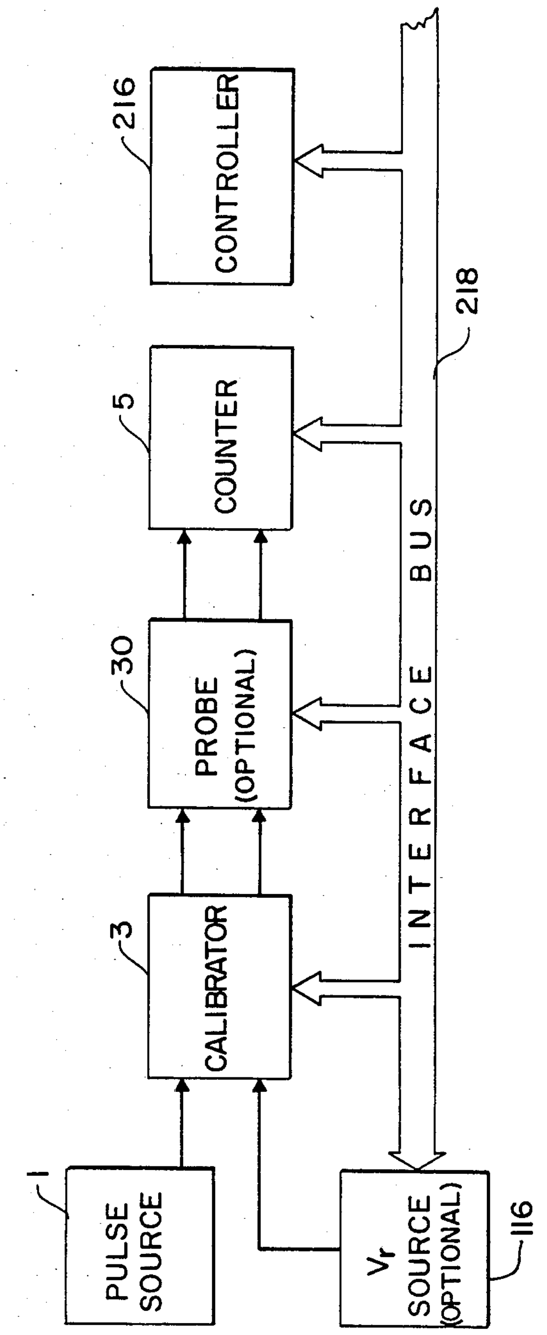
FIG. 10 is a schematic block diagram of the apparatus of FIGS. 1, 4, 7, and 9 modified for control by a computer.

The apparatus required for automating the procedure is shown in FIG. 10. The counter 5 to be calibrated should be capable of making measurements as directed by commands received from a computer controller 216 via interface bus 218 and sending the results of the measurements to controller 216 via bus 218. One example of such a counter is the Hewlett-Packard HP5370B counter. The calibrator 3 is also controlled by commands received from controller 216 via interface bus 218, one example being the Hewlett-Packard J06-59992A Time Interval Calibrator. Controller 216 can be a programmable microcomputer or minicomputer, or a dedicated intrument controller.

Controller 216 changes the internal configuration of calibrator 3 through a series of commands which cause the switches in calibrator 3 to select either the zero degree or the 180 degree power splitter and route the output signals to the start and stop inputs of counter 5. The effect of cross-connecting the signals is achieved by switching the outputs of the power splitters from the start to the stop channel and vice versa, e.g. using switch 21 shown in FIG. 1. Controller 216 also sets the voltage trigger levels and the slope polarity of the start and stop channels of counter 5, as well as any offset voltage from the source 116.

For time interval measurement calibration, controller 216 commands calibrator 3 and counter 5 to adopt the configurations needed to make the measurements of T1 through T8 given in equations 3–6 and 10–13. At each successive configuration, controller 216 commands counter 5 to take a measurement, and stores the data from that measurement. When the eight measurements have been taken, controller 216 computes the four time interval calibration constants according to equations 17(a)–(d).

For pulse width measurement calibration, a similar procedure is followed. Controller 216 configures calibrator 3 and counter 5 as needed to make the measurements of W1–W4 and PER given in equations 20–24, stores the data from the five measurements, then computes the two pulse width calibration constants according to equations 27a and 27b.

Rise and fall time measurement calibration is also facilitated with a similar procedure, and conveniently by the same apparatus, using the configurations given in equations 30 and 31.

It will be apparent to those skilled in the art of the design and calibration of time interval measurement instruments that the calibration apparatus and methods described above for use with counters can readily be applied to other types to time interval measurement instruments such as real time oscilloscopes, sampling oscilloscopes, digitizing oscilloscopes and waveform recorders.

I claim:

1. A method of calibration of a time-interval measuring apparatus having a plurality of signal channels comprising the steps of:

generating a test signal;

passively linearly splitting the test signal to form first and second coherent signals;

simultaneously a.c.-coupling the first coherent signal to a first respective channel and the second coherent signal to a second respective channel;

measuring the time interval between the coherent signals passing through the respective channels at an identical voltage level to provide a first result; and using the first result to provide a calibration constant for the measuring apparatus.

2. The method as in claim 1, further comprising the step of:

simultaneously a.c.-coupling the first coherent signal to the second respective channel and the second coherent signal to the first respective channel;

measuring the time interval between the coherent signals passing through the respective channels at an identical voltage level to provide a second result; and using the first and second results to provide a calibration constant for the measuring apparatus.

3. The method as in claim 2, wherein the step of splitting comprises the step of splitting the test signal to form first and second coherent signals in phase.

4. The method as in claim 2, wherein the step of splitting comprises the step of splitting the test signal to form first and second coherent signals 180 degrees out-of-phase.

5. The method as in claim 4, further comprising the step of biasing the coherent signals at the respective channels.

6. The method as in claim 2, further comprising the step of biasing the coherent signals at the respective channels.

7. The method as in claim 1, wherein the step of splitting comprises the step of splitting the test signal to form first and second coherent signals in phase.

8. The method as in claim 1, wherein the step of splitting comprises the step of splitting the test signal to form first and second coherent signals 180 degrees out-of-phase.

9. The method as in claim 8, further comprising the step of biasing the coherent signals at the respective channels.

10. A method of calibration of a signal width measuring apparatus having a signal channel comprising the steps of:

generating a test signal;

passively linearly splitting the test signal to form first and second out-of-phase coherent signals;

a.c.-coupling the first coherent signal to the signal channel;

measuring the width and period of the first coherent signal passing through the signal channel at a voltage level to provide a first result;

a.c.-coupling the second coherent signal to the signal channel;

measuring the width of the second coherent signal passing through the signal channel at the voltage level to provide a second result; and using the first and second results to provide a calibration constant for the apparatus.

11. The method of calibration as in claim 10, further comprising biasing the first and second coherent signals with a preselected level at the signal channel.

* * * * *

UNITED STATES PATENT AND TRADEMARK OFFICE
CERTIFICATE OF CORRECTION

PATENT NO. : 4,627,268

DATED : December 9, 1986

INVENTOR(S) : David C. K. Chu

It is certified that error appears in the above-identified patent and that said Letters Patent is hereby corrected as shown below:

Column 2, line 20, "meansure-" should read -- measure --;
Column 3, line 7, "illustrates" should read -- illustrate --;
Column 3, line 56, "and 25" should read -- and 25. --;
Column 10, line 51, "measuements" should read -- measurements --;
Column 11, line 39, "constants.for" should read -- constants. For --.

Signed and Sealed this

First Day of December, 1987

*Attest:*

DONALD J. QUIGG

*Attesting Officer* *Commissioner of Patents and Trademarks*